(12) United States Patent
Aoki

(10) Patent No.: US 6,212,933 B1
(45) Date of Patent: Apr. 10, 2001

(54) BACK GAUGE DEVICE

(75) Inventor: Makoto Aoki, Kanagawa (JP)

(73) Assignee: Amada Co., Ltd., Kanagawa (JP)

( * ) Notice: Subject to any disclaimer, the term of this patent is extended or adjusted under 35 U.S.C. 154(b) by 0 days.

(21) Appl. No.: 09/147,611

(22) PCT Filed: Jul. 30, 1997

(86) PCT No.: PCT/JP97/02646

§ 371 Date: Jun. 16, 1999

§ 102(e) Date: Jun. 16, 1999

(87) PCT Pub. No.: WO98/05442

PCT Pub. Date: Feb. 12, 1998

(30) Foreign Application Priority Data

Aug. 5, 1996 (JP) ................................. 8-205843
Mar. 31, 1997 (JP) ................................. 9-080064
May 15, 1997 (JP) ................................. 9-125533

(51) Int. Cl.$^7$ ............................................. B21D 11/22
(52) U.S. Cl. ................................... 72/461; 72/389.3
(58) Field of Search .................................. 72/461, 389.3, 72/31.1, 36

(56) References Cited

U.S. PATENT DOCUMENTS 3,826,119 * 7/1974 Marotto ............................... 72/461
4,494,312 * 1/1985 Roch ................................... 72/461
5,211,045 * 5/1993 Shimizu ............................... 72/461
5,501,095 * 3/1996 Dilger et al. ........................ 72/461

FOREIGN PATENT DOCUMENTS

2626339 * 12/1976 (DE) ................................ 72/461
3-174920 * 7/1991 (JP) ................................. 72/461
4-190924   7/1992 (JP) .
4-322822  11/1992 (JP) .

* cited by examiner

*Primary Examiner*—David Jones
(74) *Attorney, Agent, or Firm*—Greenblum & Bernstein, P.L.C.

(57) ABSTRACT

A back gauge device for a sheet metal machine with upper and lower tables, one being movable relative to another, and which machine processes a workpiece by using a die attached to the upper and lower tables. The back gauge device has a pair of link mechanisms, and a stretch to which abutments have been attached can be moved forward, backward, upward and downward via the link mechanisms. Furthermore, the back gauge device has a pair of upward-downward driving mechanisms which operate independently from each other, and the stretch having the abutments is attached thereto so as to be swingable in a vertical plane.

11 Claims, 11 Drawing Sheets

(A)

(B)

(A)

(B)

(A)

(B)

(C)

BACK GAUGE DEVICE

TECHNICAL FIELD

The present invention relates to a back gauge device, and more particularly to a back gauge device which moves abutments forward, backward, upward and downward by using link mechanisms and a back gauge device whose mechanisms for moving both ends of a stretch to which he abutments have been attached, operate independently from each other.

BACKGROUND ART

A press brake type bending machine, for example, is available as a conventional bending machine which is an example of a sheet metal machine.

Bending machines of this type are designed so that one of an upper table having a punch mounted thereon and a lower table having a die mounted thereon is moved upward and downward to apply bending processing to a workpiece by the cooperation of the punch and the die.

In light of this, if the bending machines are classified by a movable table (ram), they can be classified into two large groups of a lifting-up type in which the lower table is moved upward and downward and a lifting-down type in which the upper table is moved upward and downward. According to a lifting-up or lifting-down type bending machine, a back gauge device is arranged on its back part, and a workpiece is positioned prior to the bending processing, as is well known in the art.

The manual back gauge device illustrated in FIG. 9(A) and the automatic back gauge device depicted in FIG. 9(B) are available as back gauge devices for conventional lifting-up type bending machines. Either back gauge device comprises two supporters 104 extending from a lower table 100 (FIG. 9(C)) in a Y-axial direction, and posts 107 provided one on each of the supporters 104.

Of the above-described back gauge devices, the manual back gauge device (FIG. 9(A)) is one in which abutments 105 are attached to a stretch 106 engaged with screws 108 arranged at both ends of the stretch 106, and is designed so that the abutments 105 are moved in a Z-axial direction by manually rotating the screws 108.

Further, the automatic back gauge device (FIG. 9(B)) is one in which the abutments 105 attached to the stretch 106 are engaged with ball screws 110 in housings 116, and the back gauge device is designed so that the abutments 105 are moved in the Z-axial direction along guides 109 by driving motors M to rotate the ball screws 110.

However, according to the conventional lifting-up type bending machine, as should be apparent from FIG. 9(C), a stay 102 which couples side plates 103 arranged on both sides of the lower table 100, and the pressure-oil tank 111 of a cylinder 101 for the lower table 100, are provided under the supporters 104.

Consequently, because structures such as the aforementioned stay 102, etc. constitute an obstacle, the posts 107 (FIG. 9(A), FIG. 9(B)) which support the stretch 106, the screws 108 (FIG. 9(A)) included in mechanisms for driving the abutments 105, the motors M and the ball screws 110 (FIG. 9(B)) cannot be extended downward and cannot help but protrude above the abutments 105.

Because of this, when the abutments 105 are moved downward in order to apply overhang processing to a workpiece W, the workpiece W interferes with the motors M above the abutments 105 as shown in FIGS. 9(A) and 9(B), due to which the positioning of the workpiece W cannot be performed.

Meanwhile, the back gauge device illustrated in FIG. 10 is available as one for a lifting-down type bending machine.

This back gauge device includes columnar posts 107 which extend straight from the lower surfaces of both end portions of the stretch 106 to which the abutments 105 have been attached, and the columnar posts 107 have racks 107A formed thereon.

As shown in the right-hand drawing of FIG. 10, pinions 112 engaged with the aforementioned racks 107A are coupled to each other via a torsion bar 115, and the torsion bar 115 is connected to a worm gear 113 via a left-end pinion 114.

Therefore, if a motor (not shown) connected to the worm gear 113 is driven, the posts 107 move in the Z-axial direction via the pinion 114 and the pinions 112, and accordingly the abutments 105 also move in the Z-axial direction.

As explained above, according to the lifting-down type bending machine illustrated in FIG. 10, the posts 107 extend below the abutments 105. Thus, since there are no protrusions above the abutments 105, the overhang processing can be applied to the workpiece W as shown in FIGS. 9(A) and 9(B).

However, as clearly seen from FIG. 10, the space under the stretch 106 is extremely narrow, since the posts 107, the pinions 112, 114 and the worm gear 113 are arranged under the stretch 106.

Moreover, since the stretch 106 is merely supported by the two columnar posts 107, the posts 107 are liable to warp, and the stretch 106 is considerably unsteady.

On the other hand, the above-described back gauge devices can be classified into two large groups of an independent type and a non-independent type if they are classified by left- and right-hand Z-axial driving mechanisms for upwardly and downwardly moving the stretch to which the abutments have been attached.

According to an independent type back gauge device, each of the Z-axial driving mechanisms comprises a motor Mz (FIG. 11), and those mechanisms operate independently from each other when their respective motors are driven. According to a non-independent type back gauge device, the Z-axial driving mechanisms comprise a single common motor, and operate in cooperation with each other when the common motor is driven (FIG. 12).

Of the above-described back gauge devices, one including independent type Z-axial driving mechanisms has the structure shown in FIG. 11, for example, and comprises two supporters 204 extending from a lower table 200 in the Y-axial direction, posts 207 provided one on each of the supporters 204 and each having a Z-axial motor Mz, a stretch 206 extending between the two posts 207 in an X-axial direction, and abutments 205 attached onto the stretch 206.

The Z-axial motors Mz, the post 207, ball screws (not shown) incorporated in the respective posts 207 and engaged with the stretch 206, etc. form the Z-axial driving mechanisms for the stretch 206.

According to the above-described structure, when the Z-axial motors Mz provided one on each of the posts 207 are driven, both Z-axial driving mechanisms operate independently from each other to move the stretch 206 upward and downward.

Meanwhile, the back gauge device illustrated in FIG. 12, for example, is available as one including non-independent type Z-axial driving mechanisms.

This back gauge device has columnar posts 207 which extend straight from the lower surfaces of both end portions of the stretch 206 to which the abutments 205 have been attached, and the columnar posts 207 have racks 207A formed thereon.

As shown in the right-hand drawing of FIG. 12, pinions 212 engaged with the aforementioned racks 207A are coupled to each other via a torsion bar 215, the torsion bar 215 being coupled to a worm gear 213 via a left-end pinion 214, and the worm gear 213 being connected to a single common motor (not shown).

The common motor, the worm gear 213, the pinion 214, the torsion bar 215, the pinions 212, the racks 207A and the posts 207 form the Z-axial driving mechanisms for the stretch 206.

Hence, when the common motor (not shown) connected to the worm gear 213 is driven, the posts 207 move in the Z-axial direction via the pinion 214 and the pinions 212; that is, both Z-axial driving mechanisms operate interlocking with each other to move the entire stretch 206 upward and downward.

Of the independent type Z-axial driving mechanisms (FIG. 11) and the non-independent type Z-axial driving mechanisms (FIG. 12), the latter non-independent type driving mechanisms (FIG. 12) are designed so that when the single common motor is driven, the rotations of the motor are communicated to the torsion bar 215 via the worm gear 213 and the pinion 214.

Furthermore, the rotations of the torsion bar 215 are converted to the upward and downward movements of the racks 207A, and as the posts 207 having the racks 207A formed thereon move upward and downward, the stretch 206 also moves upward and downward.

In light of this, the upward and downward movements of the stretch 206 can be said to be controlled by the rotations of the single torsion bar 215, which rotations are in turn controlled by the single common motor.

Due to this, even if the common motor or the like breaks down, no difference occurs in the positions in height at which the right- and left-hand portions of the stretch 206 are located, because both Z-axial driving mechanisms comprising the posts 207, etc. operate simultaneously with each other. Furthermore, if, for example, the common worm gear 213 breaks, both Z-axial driving mechanisms stop simultaneously with each other, while if the torsion bar 215 breaks, both Z-axial driving mechanisms also stop simultaneously with each other, and therefore no difference occurs in the positions in height at which the right- and left-hand portions of the stretch 206 are located.

However, the independent type Z-axial driving mechanisms illustrated in FIG. 11 have structures independent from each other and including their respective Z-axial motors Mz, ball screws, nuts, etc.

Consequently, in the case where one of the Z-axial motors Mz breaks, a difference can occur in the positions in height at which the right- and left-hand portions of the stretch 206 are located, since both Z-axial driving mechanisms operate independently from each other.

As a result, a stress is applied to the entire mechanism including both Z-axial driving mechanisms and the stretch 206, damaging the rotary shafts of the Z-axial motors Mz, the ball screws and nuts incorporated in the posts 207, and the stretch 206, etc. In short, due to a difference in the positions in height at which the right- and left-hand portions of the stretch 206 are located, the back gauge device is damaged mechanically, becoming unusable.

The first object of the present invention is to provide a back gauge device whose workpiece overhang processing range has been enhanced by supporting through utilization of link mechanisms a stretch with abutments attached thereto, while the support condition is stable and a lower space has been ensured.

The second object of the present invention is to provide a back gauge device which prevents applying a stress to the entire mechanism and so avoids mechanical damage, by swinging the stretch in a vertical plane if a difference occurs in the positions in height of the right- and left-hand portions of the stretch.

DISCLOSURE OF INVENTION

The first invention of the present invention comprises a pair of link mechanisms each having a plurality of parts; a pair of forward-backward (Y-axial) driving mechanisms, coupled to end portions of the pair of link mechanisms, for moving the pair of link mechanisms forward and backward; a pair of upward-downward (Z-axial) driving mechanisms, coupled to other end portions of the pair of link mechanisms, for moving the pair of link mechanisms upward and downward by expanding and contracting the pair of link mechanisms between the pair of upward-downward (Z-axial) driving mechanisms and the pair of forward-backward driving mechanisms; and a stretch which couples the pair of upward-downward driving mechanisms together and which has abutments that are movable rightward and leftward (the x-axial direction). According to this structure, the abutments attached to the stretch, which is located at the same position in height as the upward-downward (Z-axial) driving mechanisms, move upward and downward, due to which there are no projections above the abutments and the overhang processing can be applied to the workpiece, while since the stretch is supported by the link mechanisms, the support condition is considerably stable, and because there are no protrusions such as driving mechanisms, etc. under the forward-backward (Y-axial) driving mechanisms, the lower space is ensured.

Moreover, the second embodiment of the present invention comprises a pair of upward-downward driving mechanisms (Z-axial) which operate independently from each other; horizontal shafts provided in the pair of upward-downward (Z-axial) driving mechanisms; and a stretch supported by the horizontal shafts, attached swingably in a vertical plane and having abutments which are movable rightward and leftward (the X-axial direction). According to this structure, even if any difference occurs in the positions in height of the right- and left-hand portions of the stretch, due to the breaking down of one of the Z-axial driving mechanisms which operate independently from each other, etc., the stretch swings around the horizontal shafts in a vertical plane and consequently avoids applying a stress to the entire mechanism, which therefore prevents mechanical damage to the back gauge device.

BEST MODE FOR CARRYING OUT THE INVENTION

The best mode for carrying out the present invention will now be described in order to explain the present invention in more detail.

Figure 1:
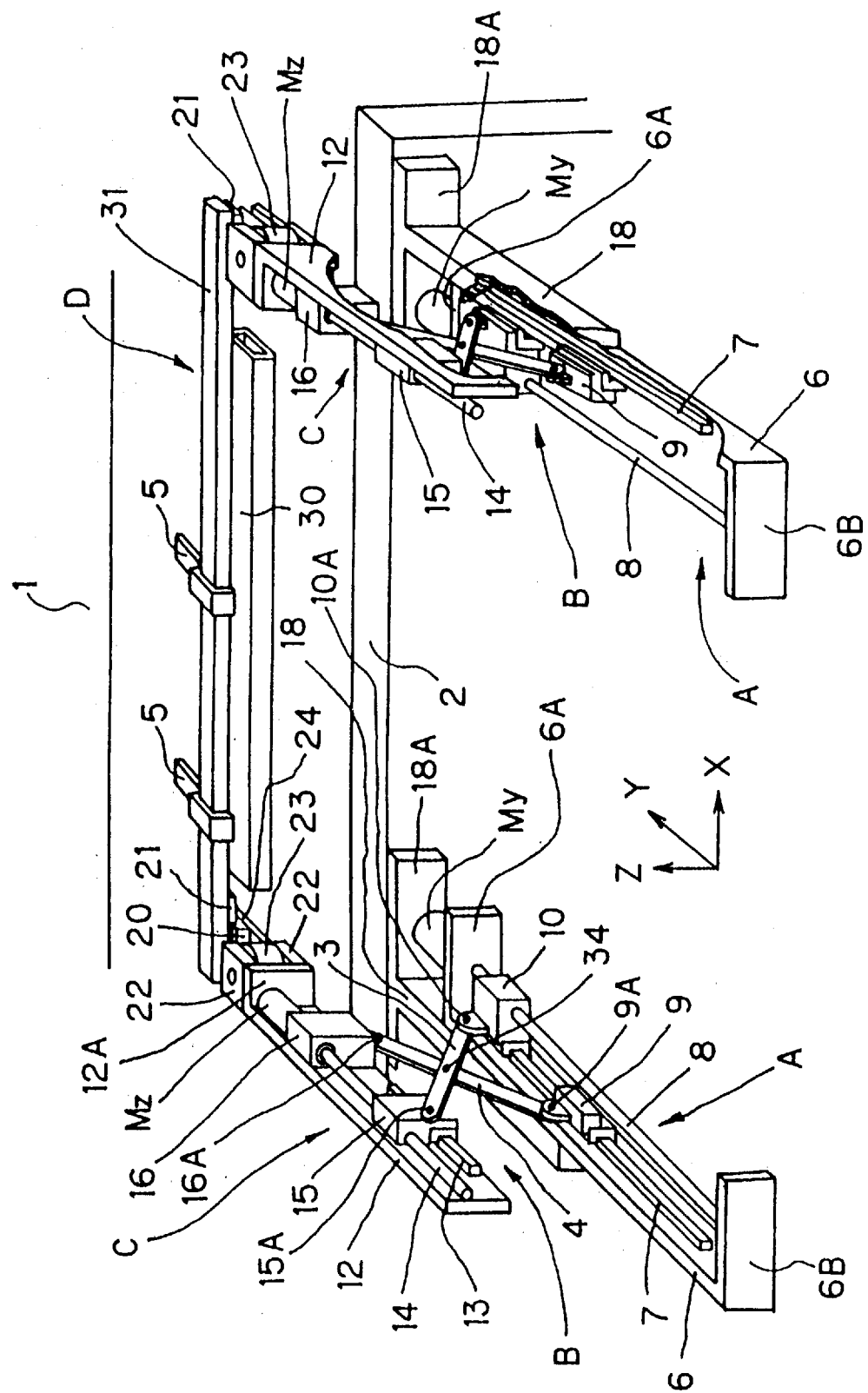
FIG. 1 is a diagram which illustrates a general view showing an embodiment of the first invention.

A. Regarding First Invention:

FIG. 1 is a diagram showing the case where a back gauge device according to the present invention is applied to a bending machine and illustrating a perspective view which is seen from the back side of the bending machine.

The bending machine has a lower table 2 arranged parallel with an X-axis, an upper table 1 is provided directly above the lower table 2, and the bending processing is applied to the workpiece W with the cooperation of a punch (not shown) mounted on the upper table 1 and a die (not shown) mounted on the lower table 2, as explained previously.

Two T-shaped support members 18 are provided one at either end of the aforementioned lower table 2 so as to extend backward, while U-shaped support members 6 are fixed one to each of the T-shaped support members 18.

Y-axial motors My are fixed one between each of the proximal end portions 18A of the support members 18 and a corresponding one of the proximal end portions 6A of the support members 6, while ball screws 8 are connected one to each of the Y-axial motors My, each ball screw 8 extending up to the distal end portion 6B of the corresponding support member 6 through the proximal end portion 6A thereof.

Y-axial driving blocks 10 are in mesh with their corresponding ball screws 8 via nuts (not shown) incorporated therein so that the Y-axial driving blocks 10 move in the Y-axial direction when the ball screws 8 are rotated by the Y-axial motors My.

Y-axial rails 7 are fixed one to each of the inner sides of the support members 6, while Y-axial driven blocks 9 and the aforementioned Y-axial driving blocks 10 are slidably coupled to their corresponding Y-axial rails 7.

Furthermore, one lower end portion of each of a pair of link mechanisms B is pivotally attached to the corresponding Y-axial driving block 10 via a hinge 1 OA, while the other lower end portion thereof is pivotally attached to the corresponding Y-axial driven block 9 via a hinge 9A.

Hence, the aforementioned T-shaped support members 18, the U5 shaped support members 6 fixed to the T-shaped support members 18, the Y-axial motors My fixed one between each of the proximal end portions 18A of the T-shaped support members 18 and a corresponding one of the proximal end portions 6A of the U-shaped support members 6, the ball crews 8 connected to the Y-axial motors My and engaged with the Y-axial driving blocks 10, the Y-axial rails 7 fixed to the U-shaped support members 6, the Y-axial driving blocks 10 and the Y-axial driven blocks 9 slidably coupled to the Y-axial rails 7, form a pair of Y-axial driving mechanisms A which move the pair of link mechanisms B in the Y-axial direction.

The above-described link mechanisms B, each of which has links 3 and 4 coupled to each other via a pin 34 so that the links 3 and 4 cross each other at their central portions, are expandable and contractible in the Z-axial direction, and the lower end portions of each link mechanism B are pivotally attached to the corresponding Y-axial driving mechanism A via the hinges 9A and 10A as mentioned previously, while the upper end portions of each link mechanism B are pivotally attached via hinges 15A and 16A to a corresponding one of a pair of Z-axial driving mechanisms C which will be described later.

The upper end portion of each of the links 3, included in the aforementioned link mechanisms B, is pivotally attached to the corresponding Z-axial driving block 15 via a hinge 15A and also supports the corresponding Z-axial driving block 15.

Moreover, the upper end portion of each of the other links 4, included in the link mechanisms B, is pivotally attached to the corresponding Z-axial fixed block 16 via a hinge 16A and also supports the corresponding Z-axial fixed block 16.

The aforementioned Z-axial driving blocks 15 are slidably coupled to their corresponding Z-axial rails 13 fixed one to each of the inner sides of the L-shaped support members 12, and are in mesh with their corresponding ball screws 14 via incorporated nuts (not shown).

Further, the ball screws 14 are connected to their corresponding Z-axial motors Mz, extending through their corresponding Z-axial fixed blocks 16, while the Z-axial motors Mz are fixed one to each of the inner sides of the proximal end portions 12A of the L-shaped support members 12.

Hence, the aforementioned L-shaped support members 12, the Z-axial motors Mz fixed to the inner sides of the proximal end portions 12A of the L-shaped support members 12, the ball screws 14 connected to the Z-axial motors Mz and engaged with the Z-axial driving blocks 15, extending through the Z-axial fixed blocks 16, the Z-axial rails 13 fixed to the L-shaped support members 12, and the Z-axial driving blocks 15 loosely fitted on the Z-axial rails 12, form the pair of the Z-axial driving mechanisms C which move the link mechanisms B in the Z-axiai direction by expanding and contracting the pair of link mechanisms B between the pair of Z-axial driving mechanisms C and the pair of Y-axial driving mechanisms A.

Vertical shafts 23 for a stretch D, which will be explained later, are revolvably supported by their respective bearings 22 and swing plates 24 are provided in integration with their corresponding vertical shafts 23 on the outer sides of the proximal end portions 12A of the L-shaped support members 12.

Guides 20 are attached one to each of the swing plates 24, and sliders 21 for a body 31, which the stretch D comprises, are slidably coupled one to each of the guides 20 in order to guide the stretch D rightward and leftward.

Figure 4:
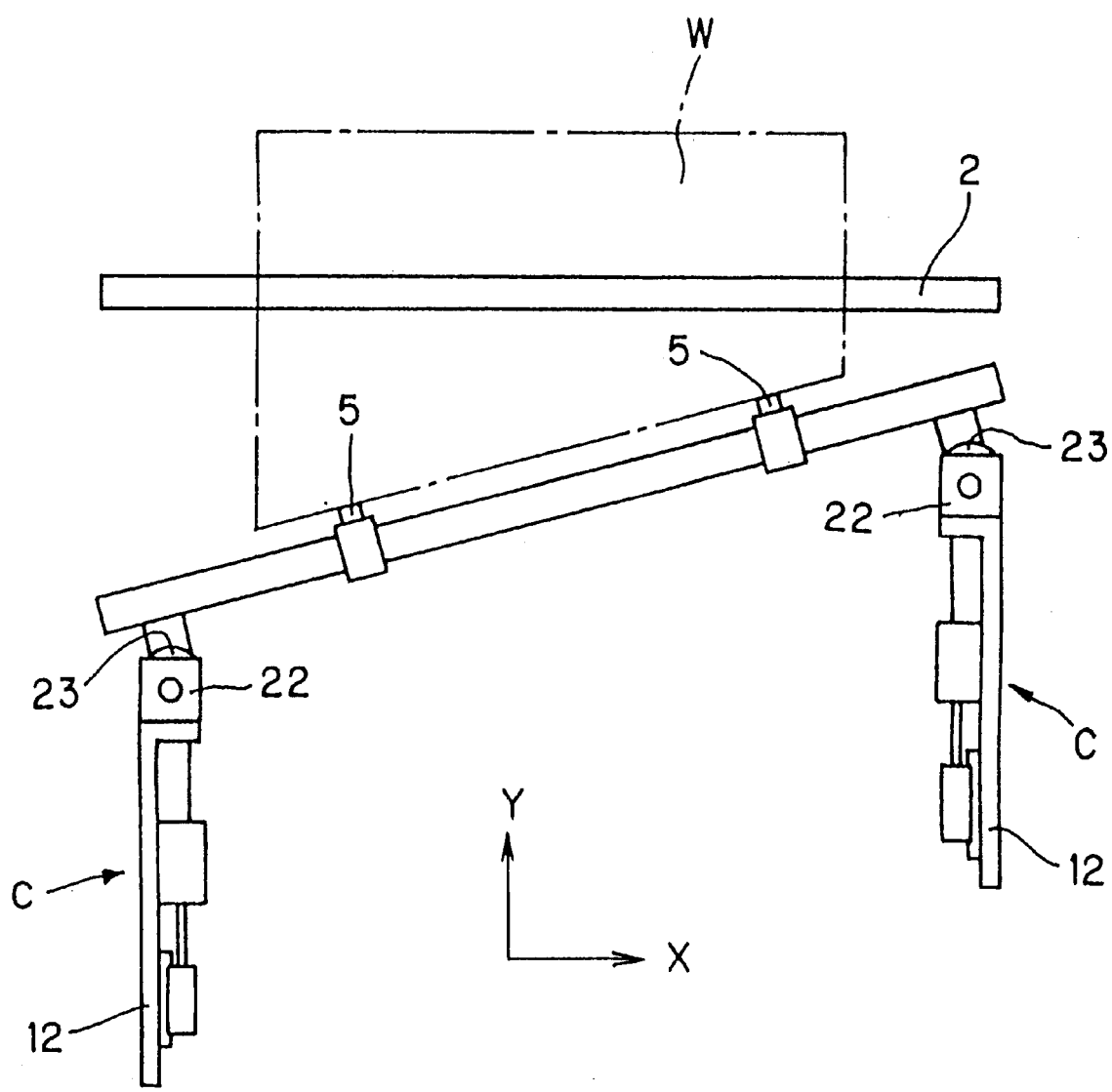
FIG. 4 is a diagram for explaining the effect of the diagonal processing according to the first invention.

This structure permits the diagonal abutting shown in FIG. 4.

The stretch D has the body 31, and the body 31 is provided at the same position in height as the Z-axial driving mechanisms C via guide mechanisms each comprising a guide 20 and a slider 21, and horizontal swing mechanisms each comprising a vertical shaft 23 and a swing plate 24, while the body 31 couples the Z-axial driving mechanisms C together.

Abutment portions 5, which are movable in the X-axial direction, are attached to the body 31 of the stretch D, and as shown in the illustration, and a reinforcing member 30 is attached to the lower surface of the body 31 so that the body 31 does not warp when the abutments 5 move in the X-axial direction.

The effect of the first invention having the above-described structure will now be explained.

Firstly, by driving X-axial motors Mx (not shown), the abutments 5 are moved on the stretch D in the X-axial direction (arrows X1 and X2) as shown in FIG. 2(A), and by driving the Y-axial motors My next, the Y-axial driving blocks 10 are moved in the Y-axial direction via the ball screws 8.

For example, as shown in FIG. 2(B), when the Y-axial driving blocks 10 are moved forward (an arrow Y1), the Y-axial driving blocks 10 and the Y-axial driven blocks 9 move forward along the Y-axial rails 7, and consequently the Z-axial driving mechanisms C, which the Y-axial driving mechanisms A support with the link mechanisms B, also move forward and the abutments 5 also move forward accordingly (the right-hand drawing of FIG. 2(B)).

Furthermore, by driving the Z-axial motors Mz, the Z-axial driving blocks 15 are moved in the Y-axial direction via the ball screws 14 toward and away from the Z-axial fixed blocks 16 such that the Z-axial driving mechanisms C are moved in the Z-axial direction via the link mechanisms B.

For example, as shown in FIG. 2(C), when the Z-axial driving blocks 15 are moved backward, the Z-axial driving blocks 15 separate from the Z-axial fixed blocks 16 (a two-directional arrow Y2).

As the Z-axial driving blocks 15 separate from the Z-axial fixed blocks 16, the links 4 included in the link mechanisms B pivot counterclockwise (an allow L in the left-hand drawing of FIG. 2(B)) on the hinges 1 OA of the Y-axial driving blocks 10, and accordingly the other links 3 included in the link mechanisms B are forced by the links 4 to pivot clockwise (an arrow R in the left-hand drawing of FIG. 2(C)) on the hinges 16A of the Z-axial fixed blocks 16 such that the Y-axial driven blocks 9, loosely fitted on the Y-axial rails 7 (FIG. 1), separate from the Y-axial driving blocks 10 (the two-directional allow Y2).

As a result of this, as shown in FIG. 2(C), the link mechanisms B contract and descend (an arrow Z1 in FIG. 2(C)), in accordance with which the abutments 5 of the stretch D provided at the Z-axial driving mechanisms C also descend.

In this case, as clearly seen from FIGS. 2(B) and 2(C), the Y-axial rails 7 comprise guides used when moving the link mechanisms B in the Y-axial direction and guides used when moving the link mechanisms B in the Z-axial direction.

As described previously, the X-axial motors Mx (not shown) are driven to move the abutments 5 in the X-axial direction (FIG. 2(A)), the Y-axial motors My are driven to move the abutments 5 in the Y-axial direction (FIG. 2(B)), and the Z-axial motors Mz are driven to move the abutments 5 in the Z-axial direction (FIG. 2(C)).

In this case, the number of rotations of the X-axial motors Mx and the distance of movement of the abutments in the X-axial direction are proportional to each other, as well as the number of rotations of the Y-axial motors My and the distance of movement of the abutments 5 in the Y-axial direction. For example, when the number of rotations of the Y-axial motors My is doubled, the distance of movement, in the Y-axial direction, of the Y-axial driving blocks 10 (FIG. 2(B)) engaged with the ball screws 8 is also doubled, and accordingly the distance of movement of the abutments 5 in the Y-axial direction is also doubled.

Hence, in the case of moving the abutments 5 in the X-axial direction and the Y-axial direction, if a rotational command value proportional to the distance of movement of the abutments 5 is given to the X-axial motors My and the Y-axial motors My, the abutments 5 move through a predetermined distance.

Figure 3:
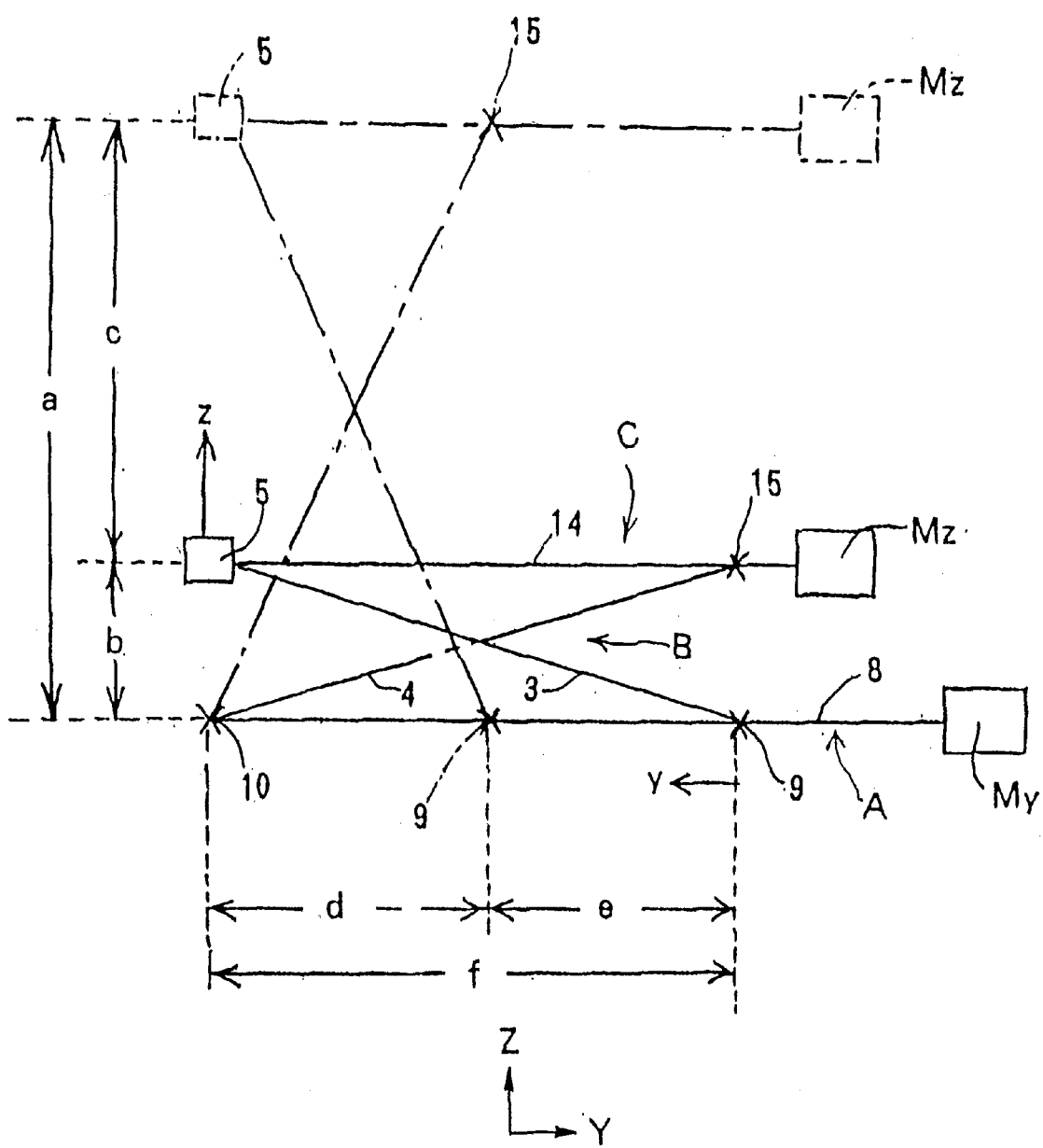
FIG. 3 is a diagram showing the relationship between the distance of movements, in the Z-axial direction, of abutments according to the first invention and the stroke of Z-axial driving blocks.

However, due to the structure (FIG. 1, FIG. 2, FIG. 3) of the link mechanisms B, the number of rotations of the Z-axial motors Mz and the distance of movement of the abutment portions 5 in the Z-axial direction are not proportional to each other, and the following conversion is necessary between them:

Now let it be assumed that, in FIG. 3, the links 3 and 4 included in the link mechanisms B are 230 mm long, the abutment portions 5 move from the lower limit position b (the unit is mm, and the same applies also to other reference characters) up to the upper limit position a, and the stroke in that case is c. Additionally, in order to simplify the illustration, the Y-axial motors My in FIG. 3 are arranged at the back of the Y-axial driving mechanisms A, while the Z-axial motors Mz are arranged at the back of the Z-axial driving mechanisms C.

In the case of making the abutments 5 perform such an operation, as mentioned previously, the Z-axial driving blocks 15 which are engaged with the ball screws 14 are moved forward (the Y-axial direction) with a stroke e by rotating the Z-axial motors Mz in the state wherein the Y-axial driving blocks 10 are fixed, simultaneously with which the Y-axial driven blocks 9 are moved in the above-mentioned direction with the aforementioned stroke e. By so doing, the abutments 5 move from the lower limit position b up to the upper limit position a (FIG. 3), due to the effect of the link mechanisms B.

At that time, if the distance between each Z-axial driving block 15 and its corresponding abutment 5 is d and if the sum of d and the aforementioned stroke e is f, the following equations are established:

$$b^2 + f^2 = 230^2 \qquad (1)$$

$$a^2 + d^2 = 230^2 \qquad (2)$$

Hence, from equation (1), $$f = \sqrt{(230^2 - b^2)} \qquad (3)$$

Moreover, from equation (2), $$d = \sqrt{(230^2 - a^2)} \qquad (4)$$

The stroke e, derived from those formulas (3) and (4), is:

$$e = f - d = \sqrt{(230^2 - b^2)} - \sqrt{(230^2 - a^2)} \qquad (5)$$

That is, in the case of moving the abutments 5 from the lower limit position b up to the upper limit position a, the Z-axial driving blocks 15 need to be moved by the distance given by equation (5), to which end the rotational command value corresponding to equation (5), where the current value is b and the target value is a, is given to the Z-axial motors Mz.

Furthermore, the stroke y (FIG. 3) of the Z-axial driving blocks 15 in the case where the abutments 5 move from the lower limit position b through a distance z (FIG. 3), can be obtained by substituting y for e and substituting b+z for a in equation (5).

$$y=\sqrt{(230^2-b^2)-\{230^2-(b+z)^2\}} \quad (6)$$

Therefore, in the case of moving the abutments 5 from the lower limit position b through the distance z, the rotational command value corresponding to equation (6), where the current value is b and the target value is z, is given to the Z-axial motors Mz.

After preparations have been conducted in the above manner, the positioning of the workpiece W is carried out by abutting the workpiece W against the abutments 5, as shown in FIG. 2(C).

In this case, there are no protrusions above the abutments 5, and the overhang processing can be applied to the workpiece W as described previously (FIG. 2(C), because the stretch D to which the abutments 5 have been attached is provided at the same position in height as the Z-axial driving mechanisms C, and the abutments 5 can be moved in the Z-axial direction (FIG. 2(C)) by upwardly and downwardly moving the link mechanisms B whose end portions have been pivotally attached to the Z-axial driving mechanisms C and the Y-axial driving mechanisms A. Moreover, since the stretch D to which the abutments 5 have been attached is supported by the link mechanisms B formed by crossing the links 3 and 4, the support condition is considerably stable, and moreover, since protrusions such as driving mechanisms, etc. are not present below the Y-axis driving mechanisms A, the lower space is ensured. Further, the diagonal processing can also be performed as shown in FIG. 4, by setting the stop positions of the Z-axial driving mechanisms C different from each other and diagonally abutting the abutments against the workpiece W having the illustrated shape.

Figure 9:
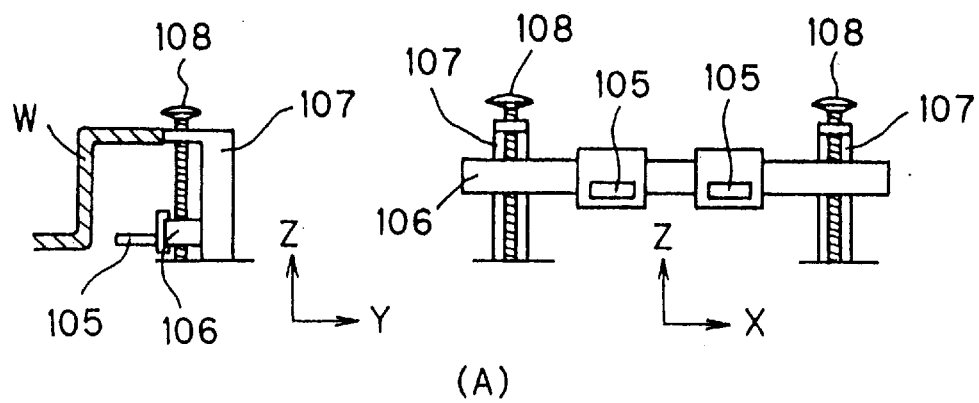
FIG. 9 is a diagram for explaining a conventional back gauge device for an lifting-up type bending machine.
Figure 9:
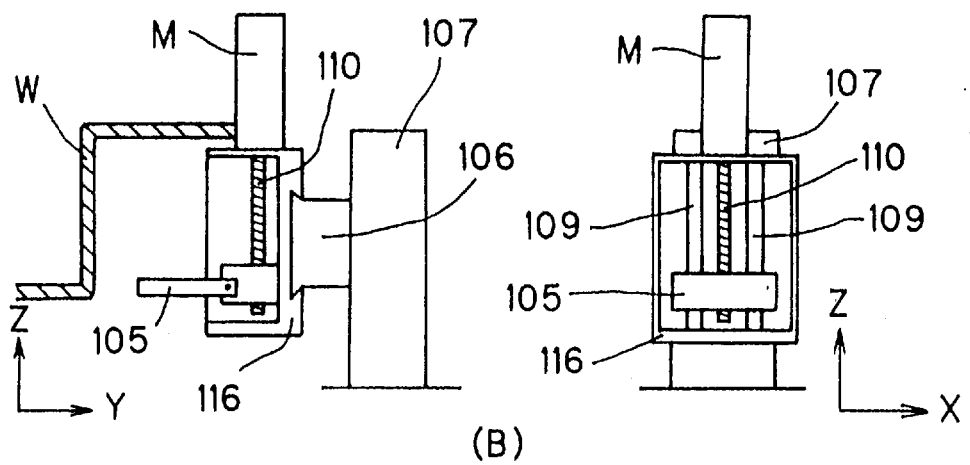
Figure 9:
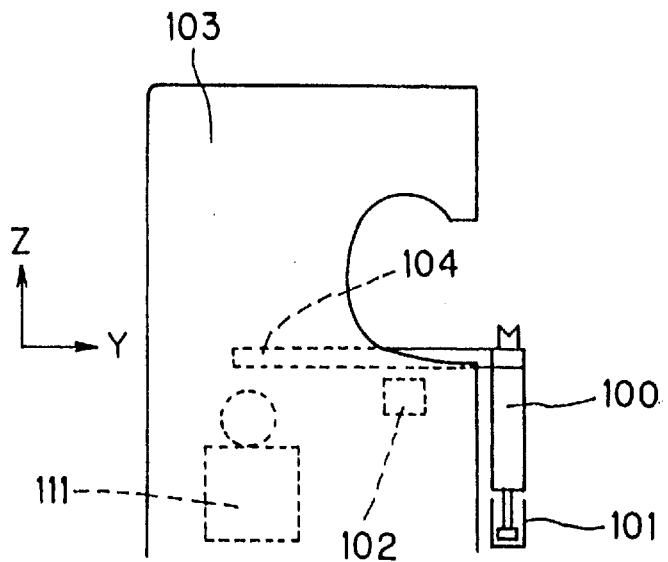
Figure 10:
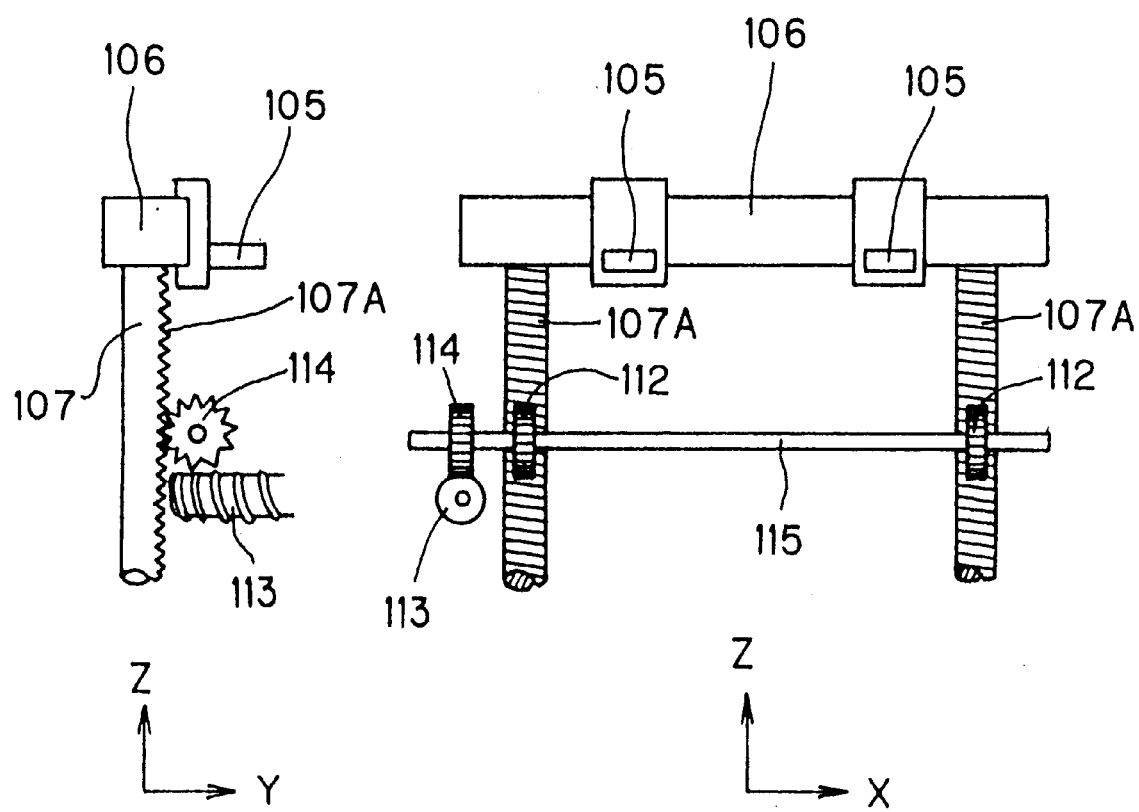
FIG. 10 is a diagram for explaining a conventional back gauge device for a lifting-down type bending machine.
Figure 11:
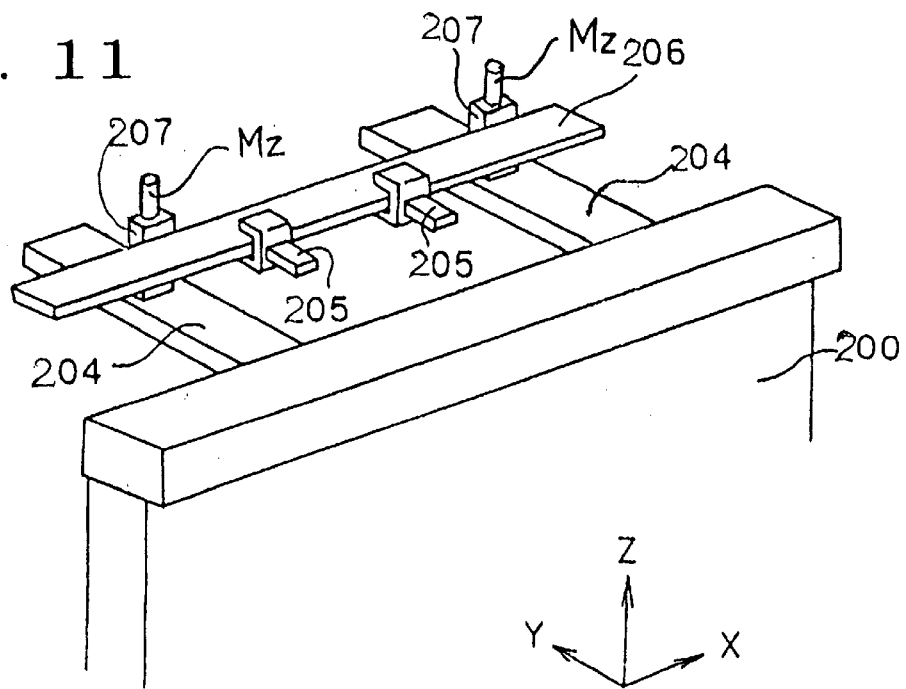
FIG. 11 is a diagram for explaining a conventional back gauge device comprising independent type Z-axial driving mechanisms.
Figure 12:
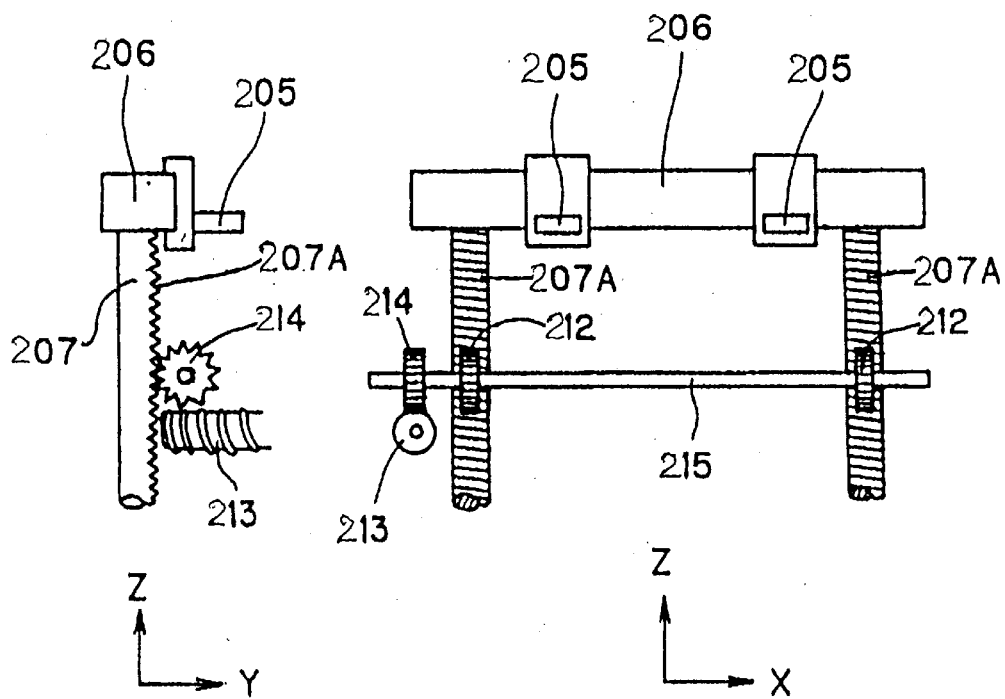
FIG. 12 is a diagram for explaining a conventional back gauge device comprising non-independent type Z-axial driving mechanisms.

By so doing, the diagonal overhang processing of the workpiece W, which could not conventionally be performed (FIG. 9) because the abutments 105 interfered with protrusions above them, can be performed (FIG. 4), at which point also the overhang processing range has been improved.

B. Second Invention

Figure 5:
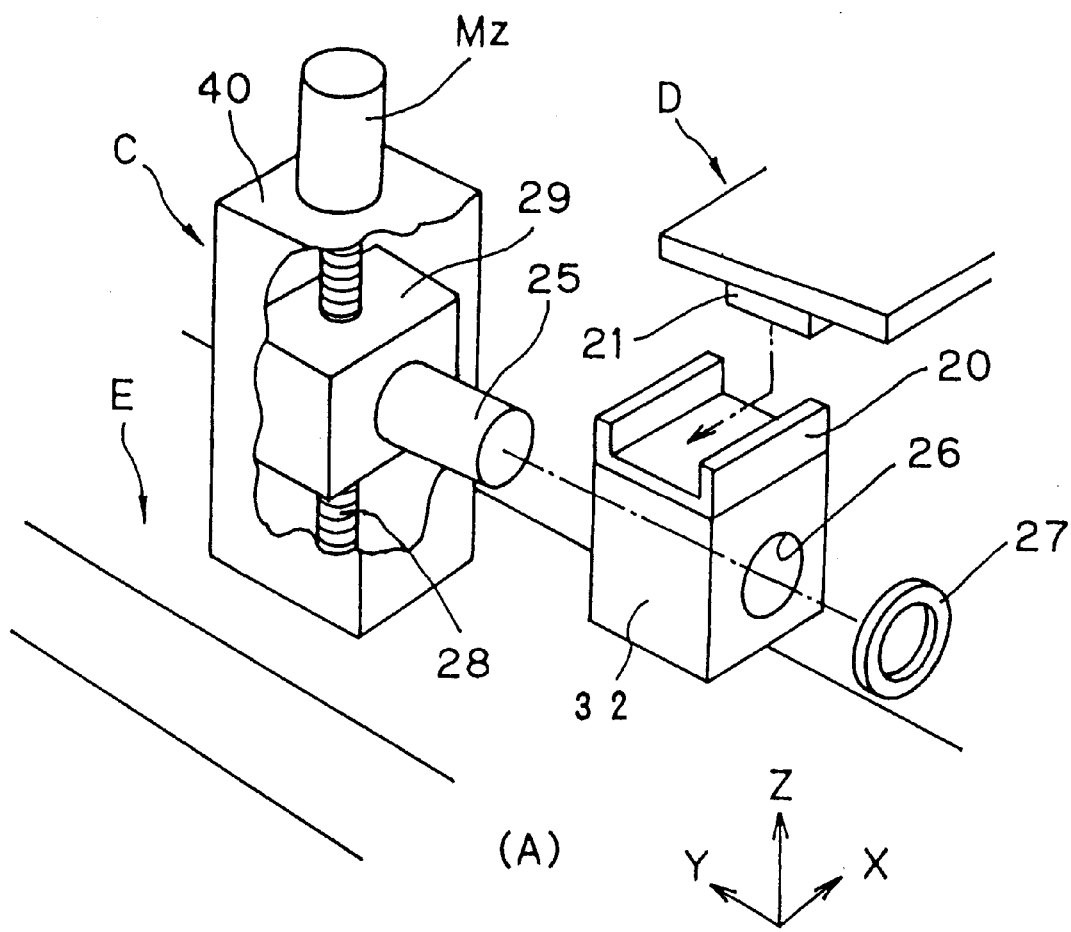
FIG. 5 is a diagram showing the first embodiment of the second invention.
Figure 5:
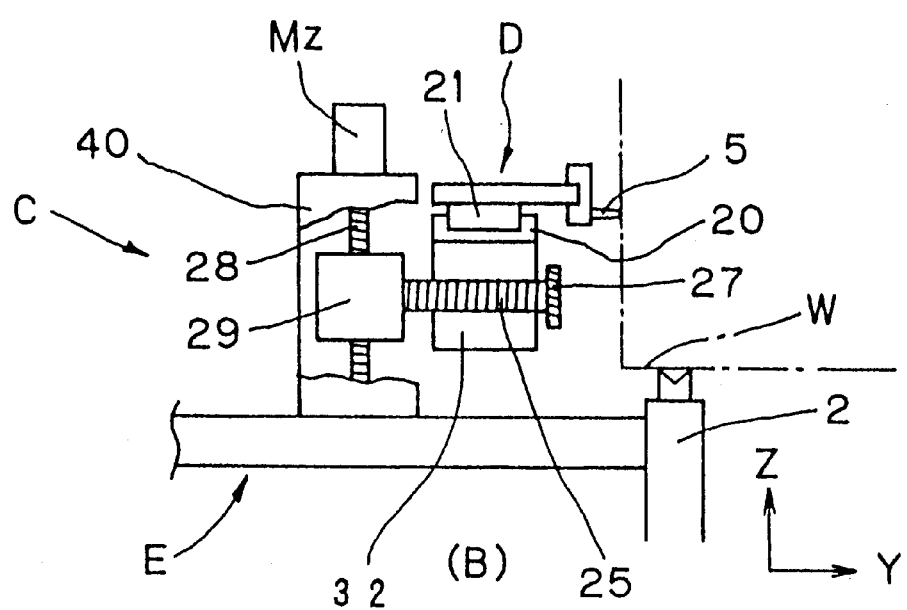
Figure 6:
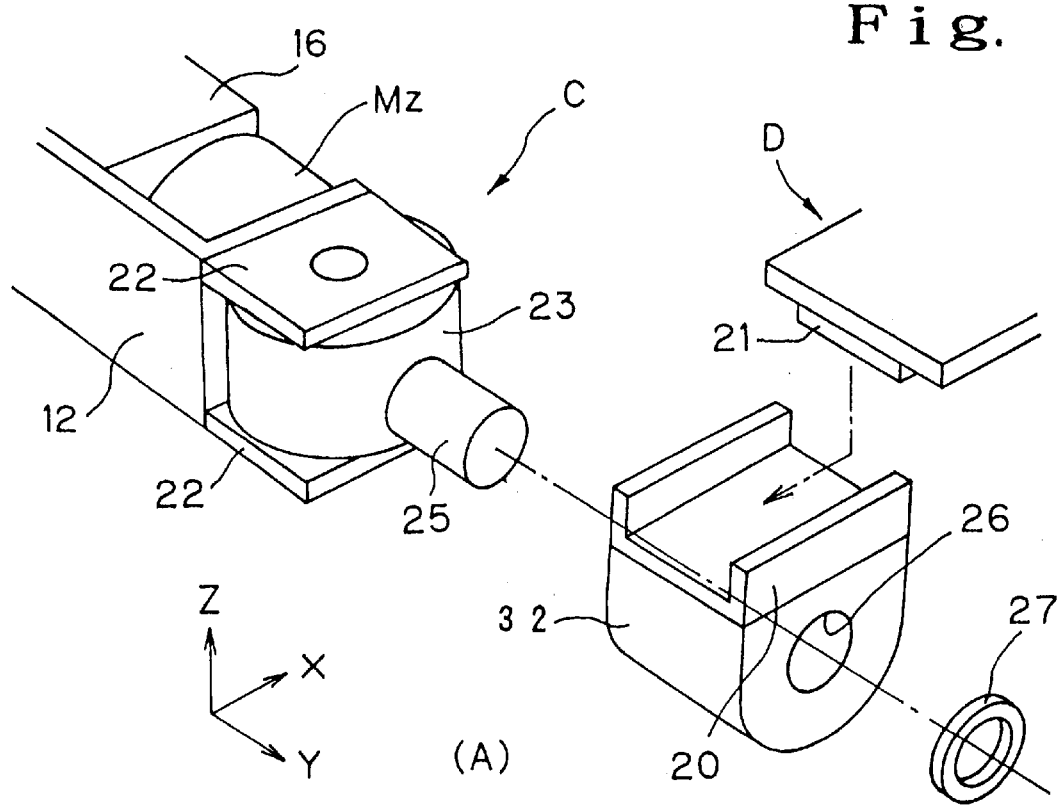
FIG. 6 is a diagram showing the second embodiment of the second invention.
Figure 6:
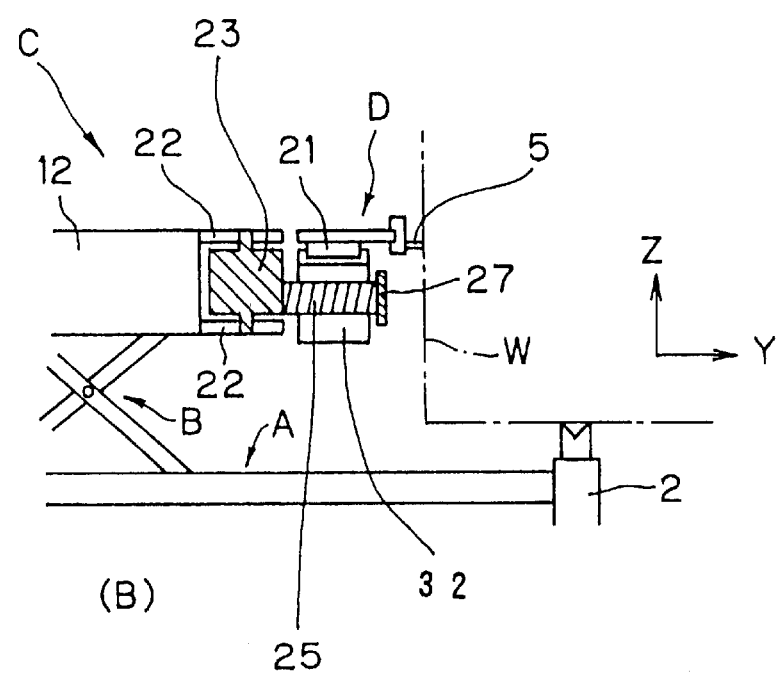

FIG. 5 is a diagram showing the first embodiment of the second invention, while FIG. 6 is a diagram showing the second embodiment of the second invention, the former drawing illustrating a back gauge device employing posts 40, the latter drawing illustrating a back gauge device employing the link mechanisms B, and both devices having the Z-axial driving mechanisms C which operate independently from each other.

The back gauge device of FIG. 5 comprises supporters E extending from the lower table 2 in the Y-axial direction, the posts 40 provided one on each of the supporters E, the stretch D extending in the X-axial direction between the two posts 40, and the abutments 5 attached onto the stretch D.

And the Z-axial motors Mz, which are provided one on each of the posts 40, are coupled to ball screws 28 incorporated in the posts 40.

Further, driving blocks 29 are engaged with their corresponding ball screws 28 via nuts (not shown).

The aforementioned posts 40, the Z-axial motors Mz, the ball screws 28 and the driving blocks 29 form the Z-axial driving mechanisms C which operate independently from each other.

Moreover, horizontal shafts 25, each having a stopper 27 at its distal end, are fixed one to each of the driving blocks 29 included in the Z-axial driving mechanisms C, and swing blocks 32 are loosely fitted on their corresponding horizontal shafts 25 via through holes 26.

The swing blocks 32 are provided with the guides 20, and the sliders 21 attached to the lower surface of the stretch D are slidably coupled to the guides 20.

According to this structure, when the Z-axial motors Mz are driven, the ball screws 28 rotate and the driving blocks 29 move in the Z-axial direction such that the stretch D supported via the horizontal shafts 25 and the swing blocks 32 move upward and downward.

Figure 8:
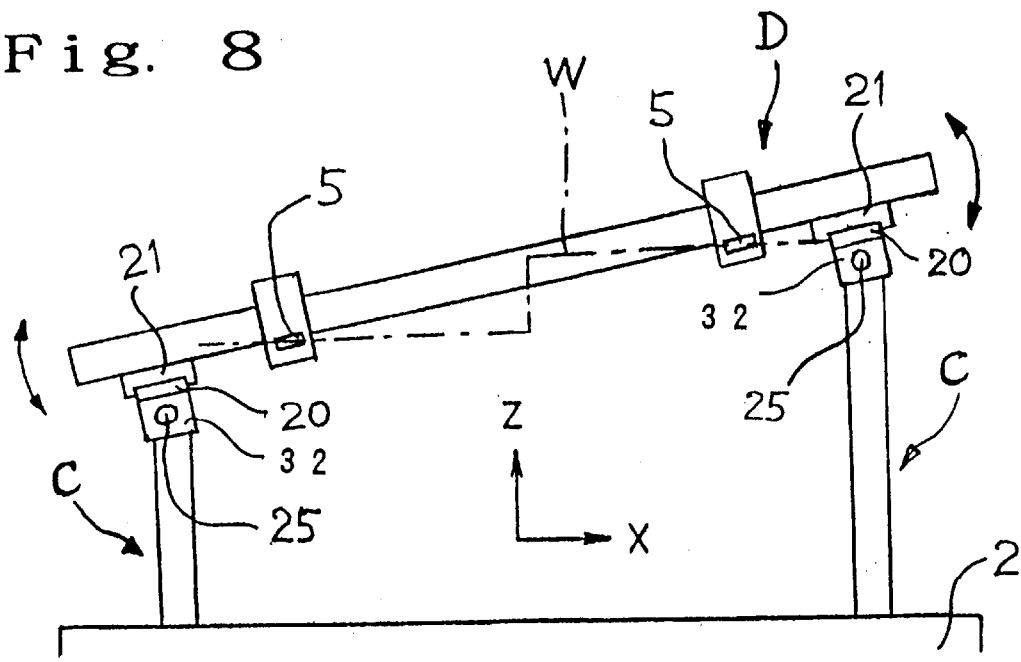
FIG. 8 is a diagram for explaining the effect of the second invention.
Figure 8:
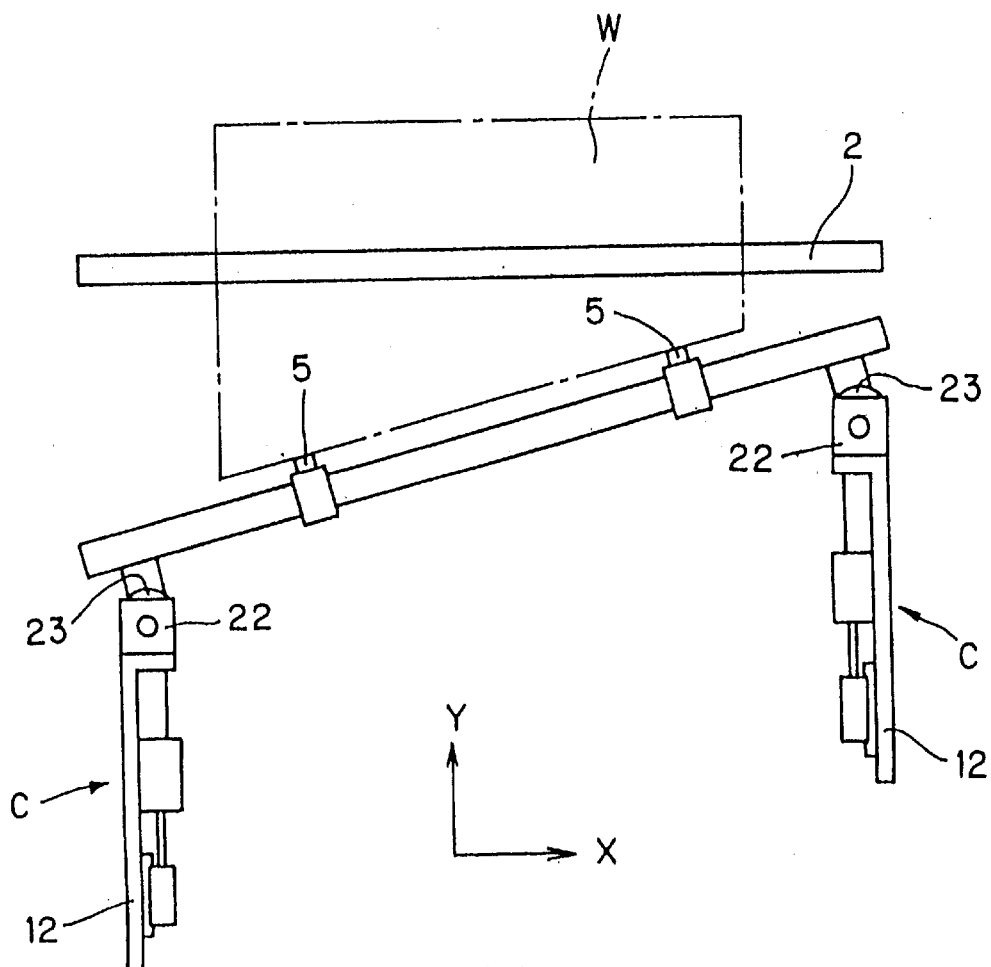

And even if a difference occurs in the positions in height at which the right- and left-hand portions of the stretch D are located, due the breaking down of any one of the Z-axial motors Mz or the like, the stretch D swings in a vertical plane (FIG. 8(A)) and slides along the guides 20 in the X-direction, and therefore forces can be released even in the case where an increase occurs in the span.

Figure 7:
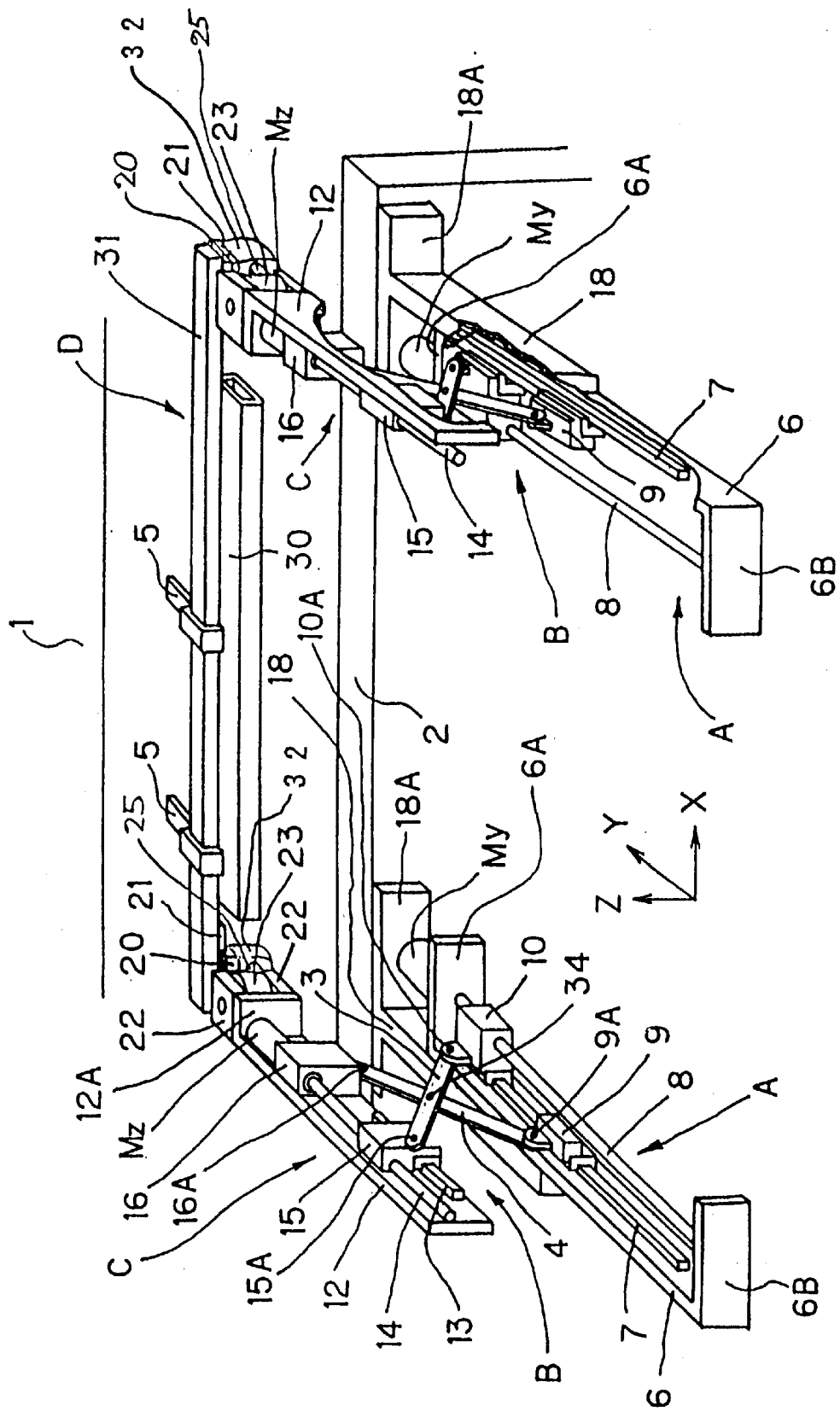
FIG. 7 is a diagram showing the case where the second invention is applied to a lifting-up type bending machine.

The back gauge device of FIG. 6 has the Z-axial driving mechanisms C which expand and contract in the Z-axial direction due to the link mechanisms B (FIG. 6(B), FIG. 7), the link mechanisms B are supported by their corresponding Y-axial driving mechanisms A, and the Y-axial driving mechanisms A extend from the lower table 2 in the Y-axial direction.

Both Z-axial driving mechanisms C operate independently from each other, the bearings 22 are fixed to the outer sides of the proximal end portions 12A of the L-shaped support members 12 included in the Z-axial driving mechanisms C, and the vertical shafts 23 are attached to the bearings 22 so as to be revolvable in a horizontal plane, i.e., an XY plane.

Moreover, the horizontal shafts 25 having the stoppers 27 at their distal ends are fixed to the aforementioned vertical shafts 23, and the swing blocks 32 are loosely fitted on the horizontal shafts 25 via the through holes 26.

The swing blocks 32 are provided with the guides 20, and the sliders 21 attached to the lower surface of the stretch D are slidably coupled to the guides 20.

According to this structure, when the Z-axial motors Mz included in the Z-axial driving mechanisms C are driven, the link mechanisms B contract as described previously (FIG. 2(C)) such that the stretch D supported via the vertical shafts 23, the horizontal shafts 25 and the swing blocks 32 move upward and downward.

And even if a difference occurs in the positions in height at which the right- and left-hand portions of the stretch D are located, due the breaking down of any one of the Z-axial motors Mz or the like, the stretch D swings in a vertical plane (FIG. 8(A)) as will be explained later, and slides along the guides 20 in the X-direction, therefore forces can be released even in the case where an increase occurs in the span.

Further, by virtue of the vertical shafts 23, the horizontal shafts 25 and the swing blocks 32, the diagonal abutting in a vertical plane can be performed as will be explained later (FIG. 8(A)), and also the diagonal abutting in a horizontal plane can also be performed (FIG. 8(B)).

That is, the stretch D with the abutments 5 attached thereto are attached to the Z-axial driving mechanisms C which serve as upward-downward driving mechanisms, via guide mechanisms each comprising a guide 20 and a slider 21 and horizontal-vertical swing mechanisms each comprising a vertical shaft 23, a horizontal shaft 25 and a swing block 32.

FIG. 7 is a diagram showing the case where the back gauge device employing the link mechanisms B and shown in FIG. 6 is applied to a lifting-up type bending machine whose lower table 2 moves upward and downward, and illustrating a perspective view from the back side of the bending machine.

In FIG. 7, the stretch D is attached via the bearings 22, the vertical shafts 23, the horizontal shafts 25 and the swing blocks 32 to the outer sides of the proximal end portions 12A of the L-shaped support members 12 to which the Z-axial motors Mz have been fixed, so that the stretch D is swingable in a vertical plane.

The stretch D has the body 31, and the abutments 5 which are movable in the X-axial direction are attached to the body 31.

The structures of the other portions shown in FIG. 7 are completely the same as those shown in FIG. 1, and therefore the explanations thereof are excluded.

The effect of the second invention having the above-described structure will now be described.

Figure 2:
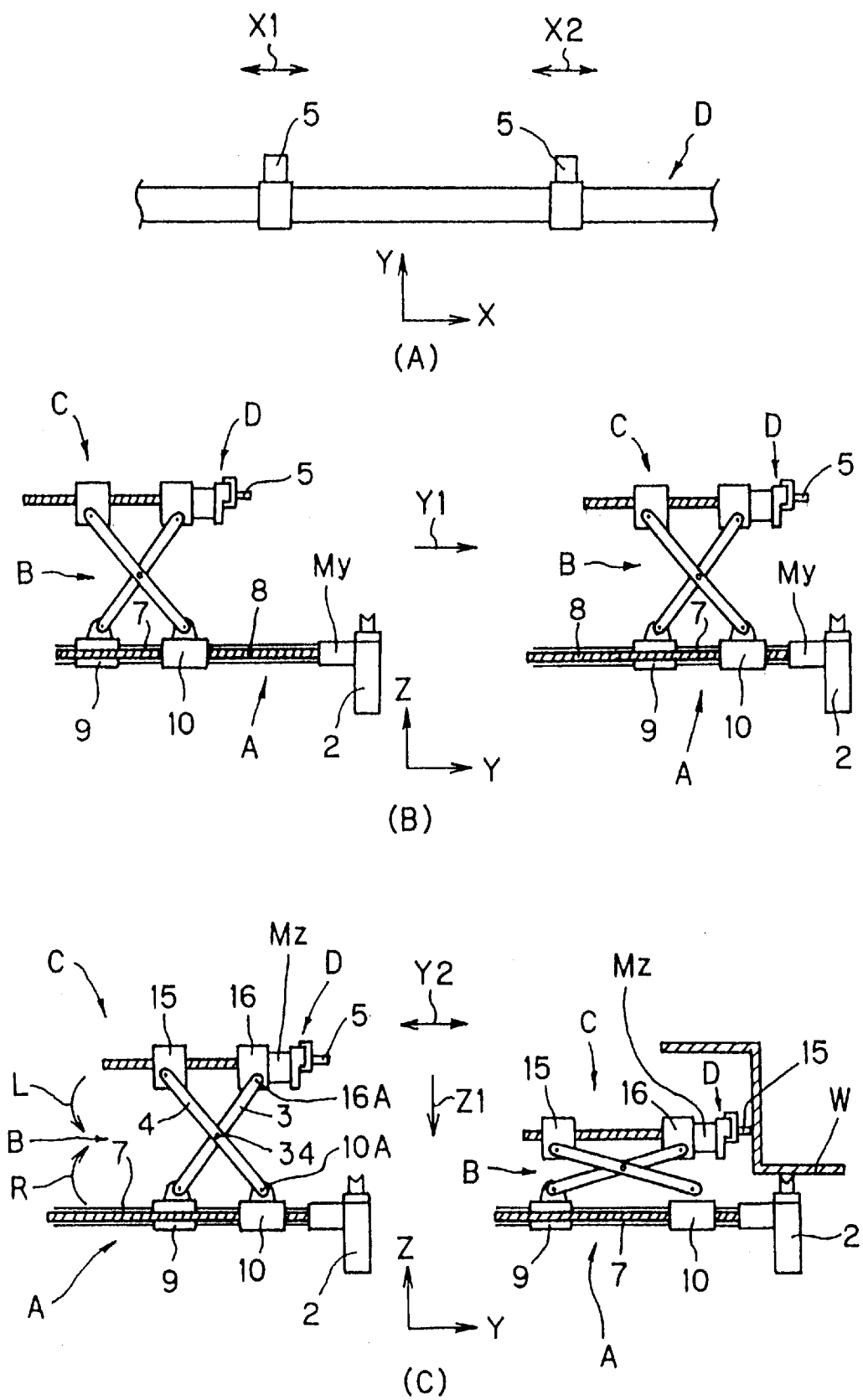
FIG. 2 is a diagram for explaining the effect of the first invention.

For example, in the case of the back gauge device (FIG. 6) employing the link mechanism B, preparations are carried out by moving the abutments as well as in the first invention (FIG. 2), after which the workpiece W is abutted against the abutments 5 in order to conduct the positioning of the workpiece W (FIG. 2(C)).

In this case, even if a difference occurs in the positions in height at which the right- and left-hand portions of the stretch D are located, due to the breaking down of, for example, one of the Z-axial motors Mz of both Z-axial driving mechanisms C, the stretch D swings around the horizontal shafts 25 in a vertical plane (XY plane), as shown n FIG. 8(A).

That is, even if the positions in height at which the right- and left-hand portions of the stretch D are located differ from each other as a result of both Z-axial driving mechanisms C having moved up to different positions in height because of the breaking down as shown in FIG. 8(A), the stretch D swings in a vertical plane, together with the sliders 21, the guides 20 and the swing blocks 32 while the stretch D is being supported by the horizontal shafts 25.

Furthermore, by virtue of the swinging of the stretch D in a vertical plane, the stretch D slides along the guides 20 via the sliders 21 in the amount according to an increase in the span, and therefore the forces are dispersed.

As a consequence, a stress applied to the entire mechanism is avoided, preventing mechanical damage.

The same effect/advantage as the above resides also in the back gauge device employing the posts 40 shown in FIG. 5.

Further, in this case, even if the Z-axial motors Mz or the like do not break down, the diagonal abutting in a vertical plane can be applied to the workpiece W having the shape illustrated in FIG. 8(A), by setting the positions in height of the Z-axial driving mechanisms C different from each other.

Moreover, as shown in FIG. 8(B), the diagonal abutting in a horizontal plane can also be applied to the workpiece W having the illustrated shape, by making the forward and backward positions (positions in the Y-axial direction) of the Z-axial driving mechanisms C different from each other, making the stretch D swing around the vertical shafts 23 in a horizontal plane (XY plane), and making the stretch D slide along the guides 20 via the sliders 21.

Incidentally, in the above-described embodiment, an explanation has been made to the case of applying the back gauge device to a lifting-up type bending machine. Needless to say, however, the present invention is not limited thereto, and can be widely applied to a lifting-down type bending machine and furthermore a sheet metal machine such as a laser processing machine, a punch processing machine, a shearing machine, etc., and the same advantages as those described above can be attained.

Industrial Applicability

Thus, the back gauge device according to the present invention, which is utilized to perform the positioning of a workpiece in a sheet metal machine, enhances the workpiece overhang processing range through utilization of the link mechanisms, the support condition is stable, the lower space is ensured, and the stretch is designed so as to be swingable in a vertical plane, whereby a stress applied to the entire mechanism is avoided to prevent mechanical damage, while the diagonal abutting in a horizontal plane and a vertical plane can also be effected.

What is claimed is:

1. A back gauge device, for use in a processing machine, the processing machine having upper and lower tables, one of said upper and lower tables extending in an X-axis direction, at least one of the upper and lower tables being movable relative to the other of the upper and lower tables, the processing machine configured to process a workpiece using a die attached to one of the upper and lower tables, the back gauge device comprising:

a pair of generally "X"-shaped link mechanisms extending in a Y-Z plane formed by a Y-axis and a Z-axis, the Y-axis being orthogonal to the Z-axis, said Y-Z plane being orthogonal to the X-axis direction, each said link mechanism having a first link and a second link, each said first link and said second link having an upper portion, a central portion, and a lower portion, said first and second links pivotally connected to each other at their respective central portions;

a pair of first driving mechanisms, each first driving mechanism of said pair of first driving mechanisms pivotally attached to a respective said link mechanism via said lower portions of said first and second links, each said first driving mechanism configured to move a respective said link mechanism along the Y-axis;

a pair of second driving mechanisms, each second driving mechanism of said pair of second driving mechanisms pivotally attached to a respective said link mechanism via said upper portions of said first and second links, each said second driving mechanism configured to move a respective said link mechanism along the Z-axis in a first Z-axis direction by moving said respective upper portions of said first and second links toward each other, and further configured to move said respective said link mechanism along the Z-axis in a second Z-axis direction by moving said respective upper portions of said first and second links away from each other; and a stretch having opposed ends, each of said opposed end connected to a respective said second driving mechanism, said stretch having at least one abutment movable in at least the X-axis direction.

2. The back gauge device according to claim 1, wherein each said first driving mechanism comprises:

a Y-axial motor affixed to the lower table via a first support member;

a ball screw connected to said Y-axial motor;

a Y-axial rail extending in the Y-axis direction;

a Y-axial driving block operably engaged with said ball screw, said Y-axial driving block configured to move along said Y-axial rail; and a Y-axial driven block configured to move along said Y-axial rail in accordance with movements of said Y-axial driving blocks;

wherein said lower portion of one of said first and second links is pivotally attached to said Y-axial driving block, and said lower portion of the other of said first and second links is pivotally attached to said Y-axial driven block.

3. The back gauge according to claim 1, wherein each said second driving mechanism comprises:

a Z-axial motor affixed to a second support member;

a ball screw connected to said Z-axial motor;

a Z-axial rail extending in the Z-axis direction;

a Z-axial driving block operably engaged with said ball screw, said Z-axial driving block configured to move along said Z-axial rail; and a Z-axial fixed block through which said ball screw extends and which is affixed to said second support member;

wherein said upper portion of one of said first and second links is pivotally attached to said Z-axial driving block, and said upper portion of the other of said first and second links is pivotally attached to said Z-axial fixed block.

4. The back gauge device according to claim 1, further comprising:

a pair of swing mechanisms;

a pair of guide mechanisms;

wherein:

said stretch further comprises a body, said body comprising a reinforcing member; and each of said opposed ends of said stretch connected to a said respective said second driving mechanism via a respective said swing mechanism and a respective said guide mechanism.

5. The back gauge device according to claim 3, wherein a rotational command value required to move each said Z-axial driving block by a stroke $y=\sqrt{(230^2-b^2)}$mm$-\sqrt{\{230^2-(b+z)^2\}}$ mm is provided to each said Z-axial motor, when moving said abutments by z mm from a lower limit position of said abutments of b mm, and wherein each said link is 230 mm long.

6. The back gauge device according to claim 5, wherein a rotational command value which is required to move said Z-axial driving blocks by a stroke $e=\sqrt{(230^2-b^2)}$mm $-\sqrt{(230^2-a^2)}$mm is given to each said Z-axial motor, when moving said abutments from the lower limit position b mm up to an upper limit position a mm.

7. A back gauge device, for use in a processing machine, the processing machine having upper and lower tables, one of said upper and lower tables extending in an X-axis direction, at least one of the upper and lower tables being movable relative to the other of the upper and lower tables, the processing machine configured to process a workpiece using a die attached to one of the upper and lower tables, the back gauge device comprising:

a pair of driving mechanisms configured to operate independently from one another along a Z-axis, the Z-axis being orthogonal to the X-axis;

a first shaft affixed to each said driving mechanism and orthogonal to the Z-axis; and a stretch having opposed ends, each said opposed end supported by a respective said first shaft, said stretch configured to pivot in an X-Z plane formed by the X-axis and the Z-axis, said stretch having at least one abutment movable in at least the X-axis direction.

8. The back gauge device according to claim 7, wherein:

each said driving mechanism includes a second shaft extending in the Z-axis direction; and each said first shaft is affixed to a respective said second shaft.

9. The back gauge device according to claim 7, further comprising:

a pair of swing blocks, each said swing block positioned about a said respective first shaft, each said swing block having a guide;

wherein said stretch has a slide at said each opposed end, each said slide configured to slidingly engage a said guide of each said swing block.

10. The back gauge device according to claim 9, further comprising:

a pair of swing mechanisms each configured to move three dimensionally, wherein each said opposed end of said stretch is affixed to a respective said driving mechanism via a respective said swing mechanism, each said swing mechanism including said first shaft and said swing block, said swing mechanism further comprising a second shaft extending in the Z-axis direction; and a pair of guide mechanisms each including a respective said guide and a respective said slide.

11. A back gauge device, for use in a processing machine, the processing machine having upper and lower tables, one of said upper and lower tables extending in an X-axis direction, at least one of the upper and lower tables being movable relative to the other of the upper and lower tables, the processing machine configured to process a workpiece using a die attached to one of the upper and lower tables, the back gauge device comprising:

a pair of generally "X"-shaped link mechanisms extending in a Y-Z plane formed by a Y-axis and a Z-axis, the Y-axis being orthogonal to the Z-axis, said Y-Z plane being is orthogonal to the X-axis direction, each said link mechanism having a first link and a second link, each said first link and said second link pivotally connected to each other at a respective central portions thereof;

a pair of first driving mechanisms each configured to move a respective said link mechanism along the Y-axis;

a pair of second driving mechanisms each configured to move a respective said link mechanism along the Z-axis; and a stretch having opposed ends, each said opposed end connected to a respective said second driving mechanism.

* * * * *

UNITED STATES PATENT AND TRADEMARK OFFICE
CERTIFICATE OF CORRECTION

| | |
|---|---|
| PATENT NO. | : 6,212,933 B1 |
| DATED | : April 10, 2001 |
| INVENTOR(S) | : M. Aoki |

Page 1 of 1

It is certified that error appears in the above-identified patent and that said Letters Patent is hereby corrected as shown below:

<u>Title page,</u>
Item [56], References Cited, the following OTHER DOCUMENTS were omitted and should be included:
-- English Language Abstract of JP-322822
English Language Abstract of JP-4-190924 --

Signed and Sealed this

Twenty-eighth Day of May, 2002

Attest:

*Attesting Officer*

JAMES E. ROGAN
*Director of the United States Patent and Trademark Office*